United States Patent

Shaw

[15] 3,653,898

[45] Apr. 4, 1972

[54] FORMATION OF SMALL DIMENSIONED APERTURES

[72] Inventor: Patrick W. Shaw, Bedford, England

[73] Assignee: Texas Instruments Incorporated, Dallas, Tex.

[22] Filed: Dec. 16, 1969

[21] Appl. No.: 882,397

Related U.S. Application Data

[63] Continuation of Ser. No. 468,256, June 30, 1965, abandoned, which is a continuation-in-part of Ser. No. 406,990, Oct. 28, 1964, abandoned.

[52] U.S. Cl. ....................96/35, 96/44, 96/36

[51] Int. Cl. ....................G03c 5/00

[58] Field of Search....................96/35, 36.2, 36, 36.3, 36.4; 156/11, 17; 148/1.5, 187; 29/578, 579; 117/323, 212

[56] References Cited

UNITED STATES PATENTS

| | | | |
|---|---|---|---|
| 3,372,071 | 3/1968 | Wisman et al. | 148/187 |
| 3,390,025 | 6/1968 | Strieter | 148/187 |
| 3,388,000 | 6/1968 | Waters et al. | 117/212 |
| 3,329,541 | 7/1967 | Mears | 156/11 |
| 3,385,702 | 5/1965 | Koehler | 96/36.2 |
| 3,423,205 | 1/1969 | Skaggs et al. | 96/36.2 |
| 3,212,162 | 10/1965 | Moore | 29/25.3 |
| 2,854,336 | 9/1958 | Gutknecht | 96/36 |

*Primary Examiner*—Norman G. Torchin
*Assistant Examiner*—E. C. Kimlin
*Attorney*—Samuel M. Mims, Jr., James O. Dixon, Andrew M. Hassell, Harold Levine and John E. Vandigriff

[57] ABSTRACT

Disclosed are methods for aperturing thin members by photochemical masking, exposing and etching techniques, such thin members may be a thin film of insulating material deposited or formed on a semiconductor substrate, or they may be a thin sheet or layer of material, such as metal.

20 Claims, 17 Drawing Figures

Patented April 4, 1972

3,653,898

7 Sheets-Sheet 1

INVENTOR
PATRICK W. SHAW

BY

John D. Graham
ATTORNEY

INVENTOR
PATRICK W. SHAW
BY John G. Graham
ATTORNEY

INVENTOR
PATRICK W. SHAW

John D. Graham

ATTORNEY

INVENTOR
PATRICK W. SHAW

John G. Graham

ATTORNEY

INVENTOR
Patrick W. Shaw

BY John G. Graham

ATTORNEY

INVENTOR
Patrick W. Shaw

BY John [signature]

ATTORNEY

Patented April 4, 1972

3,653,898

7 Sheets-Sheet 7

INVENTOR
Patrick W. Shaw

BY John D. Graham

ATTORNEY

FORMATION OF SMALL DIMENSIONED APERTURES

This is a continuation of Ser. No. 468,256, filed June 30, 1965, now abandoned, which is in turn a continuation-in-part application of our copending application, Ser. No. 406,990, filed Oct. 28, 1964 now abandoned.

This invention relates to the formation of small dimensioned apertures in thin films of material formed on a substrate or in thin sheets of material.

In the semiconductor art, to which the invention is particularly applicable, it is known to form a protective covering over a semiconductor substrate and to form apertures in the covering in order to expose desired regions of the substrate. Often it is required that the apertures shall have small dimensions, i.e., of the order of a few thousandths of an inch or less, and that the apertures shall be well defined. For example, it is known to form an oxide layer on a surface of a silicon substrate and to apply a layer of photoresist material over the oxide layer. A photographic mask having opaque areas corresponding to the apertures to be formed is then placed over the photoresist and a photographic exposure made. Regions of the photoresist not covered by opaque regions of the mask are thus rendered etch resistant while the masked regions can be dissolved to uncover the underlying regions of the oxide layer which can then be apertured by use of an etchant which does not affect the etch resistant portions of the photoresist coating.

When such apertures are required to have dimensions of the order of one thousandth of an inch or less, the limits of resolution in the photographic mask can result in undesired irregularities in the shape of the apertures produced. In particular, when using a mask having rectangular opaque areas, apertures may be produced having corners rounded to such an extent that the production of reasonably rectangular apertures having dimensions of about one thousandth of an inch or less is impracticable.

The present invention comprises a method of forming apertures in a thin sheet of material or in a thin film of material formed on a substrate, in which an etch resistant protective coating is formed over selected portions of the surface of the sheet or film and unprotected portions of the surface are chemically etched, in which a first set of parallel sided nonintersecting strips and a second set of parallel sided nonintersecting strips extending transversely of the first set together define areas of the surface unprotected by etch resistant coating, and in which the bounds of the apertures to be formed are defined by common areas of the strips of the first and second sets.

In a particular method in accordance with the invention, suitable for aperturing films formed on a substrate, the first set of strips is defined on a coating over the film and the remainder of the coating rendered etch resistant. The transversely extending second set of strips then is defined over the treated surface of the coating and the portions of the first strips uncovered by the second strips are rendered etch resistant. The untreated portions of the coating, corresponding to the area of intersection of the first and second sets of strips may then be removed and the uncovered film material apertured by chemical etching.

In another particular method suitable for aperturing films formed on substrates, the first set of strips is defined on a coating over the surface of the film and the remainder of the coating rendered etch resistant. The portions of the coating underlying the first set of strips are removed and the underlying strips of film material removed by chemical etching. The etch resistant coating then is removed and a further film, equal in thickness to the original film, is formed over the exposed surfaces of the substrate and the original film. The further film is covered with a coating on which the second set of strips, extending transversely of the first strips, is defined and the remainder of that coating is rendered etch resistant. The portions of the coating underlying the second set of strips are removed and the underlying portions of the further film removed by etching to a thickness equal to that of one of the films. This exposes the substrate only in regions defined by common areas of the first and second sets of strips. The remainder of the further film underlying the second strips, and which was subjected to etchant treatment, is removed down to the surface of the original film.

In a particular method according to the invention suitable for aperturing a thin sheet of material, the sheet is coated on both sides and the first set of strips defined on the coating on one side of the sheet while the second set of strips is defined on the coating on the opposite side. The remaining portions of the coating on both sides of the sheet are rendered etch resistant. The regions of coating underlying the first and second sets of strips are removed and the strips of sheet uncovered on either side of the sheet are subjected to chemical etching to remove a thickness of sheet, from either side thereof, equal to or slightly greater than half the total sheet thickness. Transversely extending channels are thus formed on either side of the sheet and apertures are formed at the intersections of these channels.

Methods in accordance with the invention find particular use in the semiconductor art, for example in forming apertures in an oxide film on a silicon substrate. By using such techniques it has been found possible to form apertures with a reasonably rectangular shape having dimensions of the order of two ten thousandths of 1 inch ($2 \times 10^{-4}$ inch).

The coating referred to may be of the photosensitive type, either of the kind rendered etch resistant by photographic exposure or of the kind rendered soluble, by selected solvents, when exposed. The latter kind of photosensitive coating is advantageous in that masks having transparent parallel sided strips defined thereon are easier to produce accurately than are masks having opaque parallel sided strips defined thereon.

By way of example, methods in accordance with the invention will be described in greater detail with reference to the accompanying drawings, of which:

FIG. 1 depicts by way of plan views and diagrammatic sections on the lines indicated, stages in carrying out one method;

FIGS. 2 and 3 similarly depict stages in carrying out two further methods;

The dimensions and proportions of the several figures are grossly exaggerated and are not to scale in order to more conveniently and clearly illustrate the invention. For example, the opaque strips on the masks normally will be thin lines having a thickness typically in the order of one thousandth of an inch or less.

Figure 1:
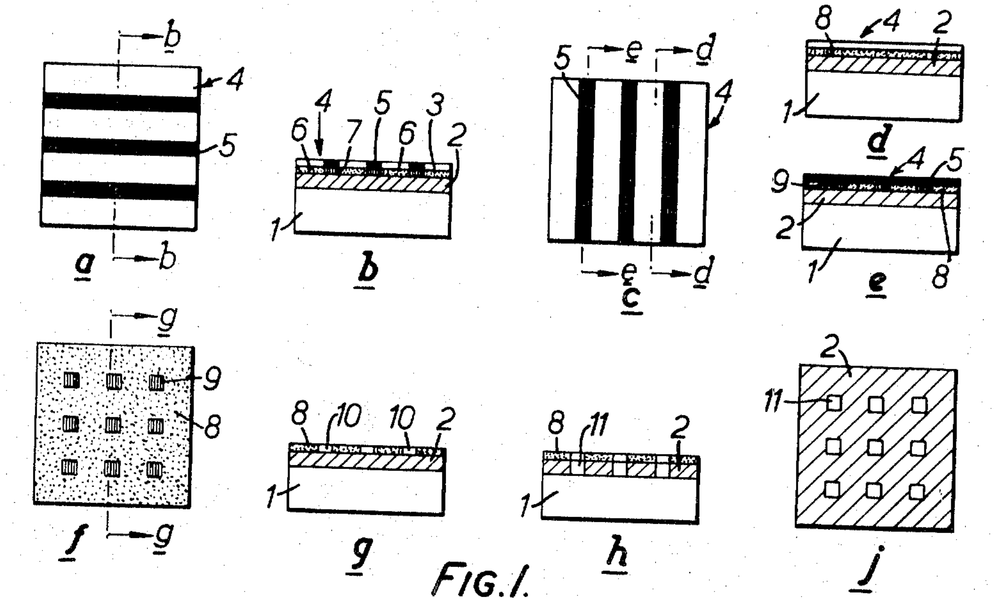

FIG. 1 depicts stages in forming square apertures in a thin oxide film formed on a silicon substrate. As shown in FIG. 1*b* a silicon slice 1 has an oxide film 2 over which is applied a coating of photoresist material 3. On top of the photoresist coating 3 is placed a photographic mask 4 on the surface of which are formed parallel sided opaque strips 5 corresponding in width to the side of the square apertures to be formed. The strips 5 are equispaced and extend parallel to each other between opposite sides of the mask, as best shown in FIG. 1*a*. With the mask 4 in contact with the coating 3 a photographic exposure is made which renders portions of the coating, other than those below the opaque strips 5, etch resistant. These exposed etch resistant areas 6 and the parallel sided unexposed strips 7 are indicated in FIG. 1*b*.

The mask 4 then is rotated through 90° and positioned in contact with the partly exposed coating 3, FIG. 1*c*, and a further photographic exposure made. The portions 8 of the strips 7 not covered by the opaque strips of the mask 4 are thus exposed and rendered etch resistant, FIG. 1*d*, whilst the portions 9 covered by the opaque strips remain unexposed, FIG. 1*e*. The coating 3 thus consists of an etch resistant area within which are equispaced square unexposed regions 9, FIG. 1*f*. These regions 9 correspond to the regions of intersection of the strips of the coating 3 masked by the opaque lines of the mask 4 during the two photographic exposures referred to above and are removed by a solvent, which does not affect the etch resistant area of the coating, to uncover square regions 10 of the underlying oxide film 2, FIG. 1*g*.

An etchant is then used to remove the uncovered areas 10 of the oxide film 2, FIG. 1*h*, using an etchant which attacks the oxide film but to which the exposed areas of the coating 3 are resistant. The etch solution is agitated ultrasonically to ensure clean leaching of the holes 11 formed in the oxide film 2, and finally the exposed coating 3 is removed, FIG. 1*j*. There is thus produced a series of square apertures 11 in the oxide film 2.

It will be appreciated that the effects of photographic resolution, previously referred to, are avoided by this method since the square unexposed areas defined in the photographic coating 3 are produced by masking transversely intersecting strips during two successive photographic exposures.

Figure 2:
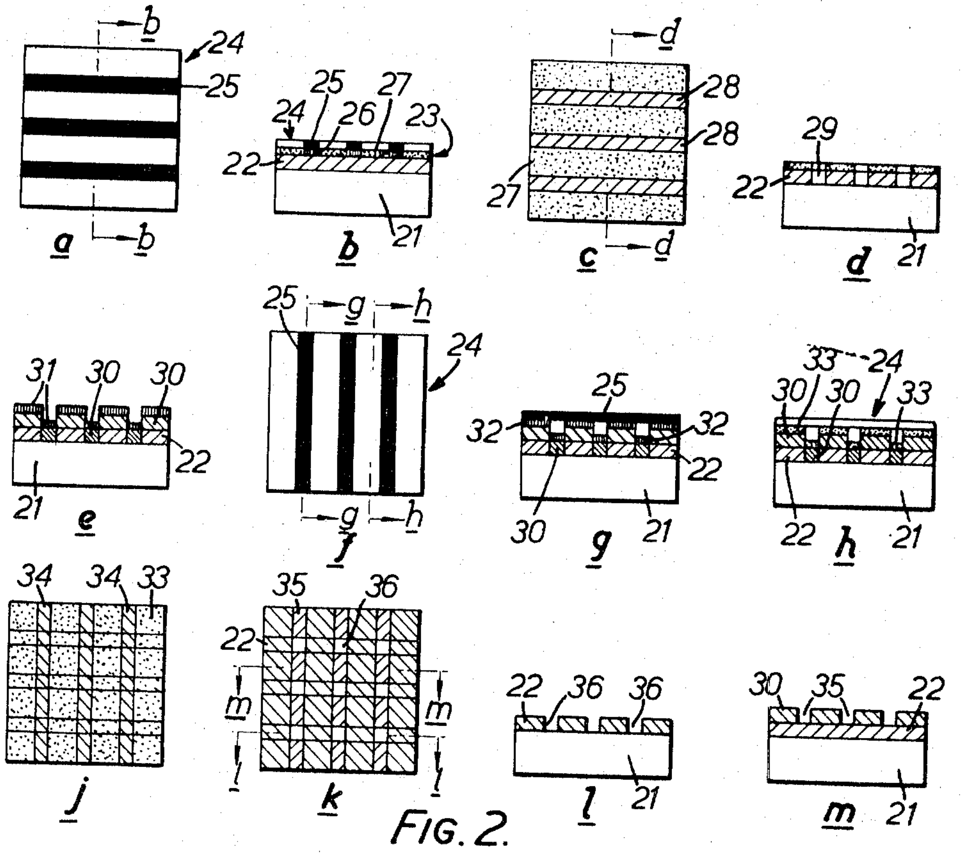

A second method in accordance with the invention for forming square apertures in an oxide film on a silicon substrate will be described with reference to FIG. 2 which depicts successive stages of the method.

A silicon slice 21 has an oxide film 22 covering one surface and a coating 23 of photographically sensitive material is applied to the oxide film, FIG. 2*b*. A photographic mask 24 having equispaced parallel sided opaque strips 25 is placed over the coating 23, FIG. 2*a*, and a photographic exposure made. The regions 26 of the coating 23 underlying the strips 5 are unexposed and the remaining regions 27 are exposed and rendered etch resistant. The coating thus consists of etch resistant regions 27 separated by unexposed parallel sided strips 26, FIG. 2*b*, which are dissolved thereby exposing parallel sided strips 28 of the underlying oxide film surface, FIG. 2*c*. These strips 28 are etched away to expose the surface of the underlying silicon slice 21, FIG. 2*d*, using the etching technique described with reference to FIG. 1 so that parallel sided channels 29 are formed in the oxide layer 22.

The exposed regions 27 of the photosensitive coating 23 then are removed and a further oxide film 30, equal in thickness to the film 22, is formed over the remaining portion of the film 22 and in the strips of the surface of the channels 29, FIG. 2*e*, and a coating of photoresist material 31 applied over the surface of the film 30. The photographic mask 24 is placed on the surface of the film 30, FIG. 2*f*, with the opaque strips 25 having been rotated through 90° with respect to the position shown in FIG. 2*a*. This adjustment is facilitated by the fact that the bounding lines of the channels 29 still are clearly visible.

A further photographic exposure is carried out and portions 32 of the film 31 underlying the opaque lines 25 are unexposed, the remaining portions 33 being rendered etch resistant, FIGS. 2*g* and 2*h*. Removal of the unexposed portions 32 by use of a solvent uncovers parallel sided strips 34 of the oxide film 30, extending perpendicularly to the channels 29, FIG. 2*j*. The uncovered strips 34 are then etched away, by the technique previously described, to remove a single thickness equal to that of one of the films 22 or 30. This etching treatment reveals the underlying film 22 in regions 35 where there are two layers of oxide film and reveals the surface of the silicon substrate in regions 36 of the strips 34 from which the first film 22 previously had been removed. It will thus be appreciated that both thicknesses of film 22 and 30 are apertured only in the regions of intersection of the exposed strips 26 and 32, FIGS. 2*k*, 2*l*, 2*m*. Again, it will be appreciated that the disadvantages associated with corner resolution when using photographic masks having rectangular opaque areas, are avoided.

It will be seen from FIGS. 2*k*, 2*l* and 2*m* that this particular method of aperturing forms channels 35 in the upper oxide film 30 which expose the underlying oxide film and these channels 35 may be used for making insulated interconnection between the apertures.

By use of the techniques described with reference to FIGS. 1 and 2, rectangular apertures having dimensions of the order of $2 \times 10^{-4}$ inch have been produced in oxide films on silicon substrates and a reasonably rectangular shape maintained.

Figure 3:
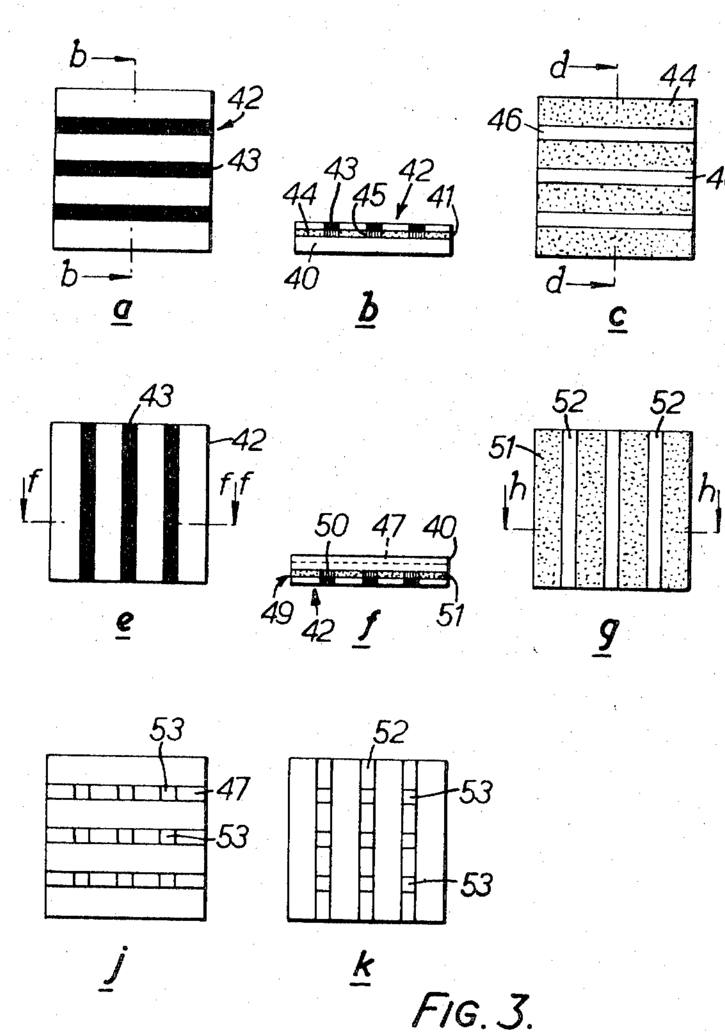

FIG. 3 depicts stages in a method, according to the invention, of forming small dimensioned apertures in a thin foil or sheet of material.

A foil 40 is coated on its upper surface with photosensitive material 41 on top of which is located a photographic mask 42 having a set of equispaced parallel sided opaque strips 43, FIGS. 3*a* and 3*b*. A photographic exposure is carried out and portions 44 of the coating 41 not masked by the opaque strips 43 are rendered etch resistant. The unexposed parallel sided strips 45 of the coating 41 are dissolved to uncover strips 46 of the foil surface, FIG. 3*c*. An etchant is used, in the manner previously described, to form channels 47 in the foil, extending half, or slightly more than half, the foil thickness, FIG. 3*d*. This etching process is carried out with the undersurface 48 of the foil protected so that it is not attacked by etchant.

The undersurface 48 of the foil is then covered with a photosensitive coating 49 and the mask 42 placed over the coating 49 with the opaque strips 43 rotated through 90°, FIG. 3*e*. A photographic exposure is made and portions 50 of the coating 49 under the opaque strips 43 remain unexposed while the remaining portions 51 are rendered etch resistant, FIG. 3*f*. The unexposed portions 50 are dissolved, FIG. 3*g*, and the uncovered strips of the foil surface 48 are subjected to etching treatment, the channeled upper surface of the foil being protected, and channels 52 having a depth of about half the foil thickness are formed, FIG. 3*h*, so that in the intersecting regions of the channels 47 and 52 apertures 53 are produced in the foil, FIGS. 3*j* and 3*k*.

In this method of forming aperture in a foil, the upper and under surfaces may be etched simultaneously but sequential etching offers greater control of the operation.

Figures 4, 5:
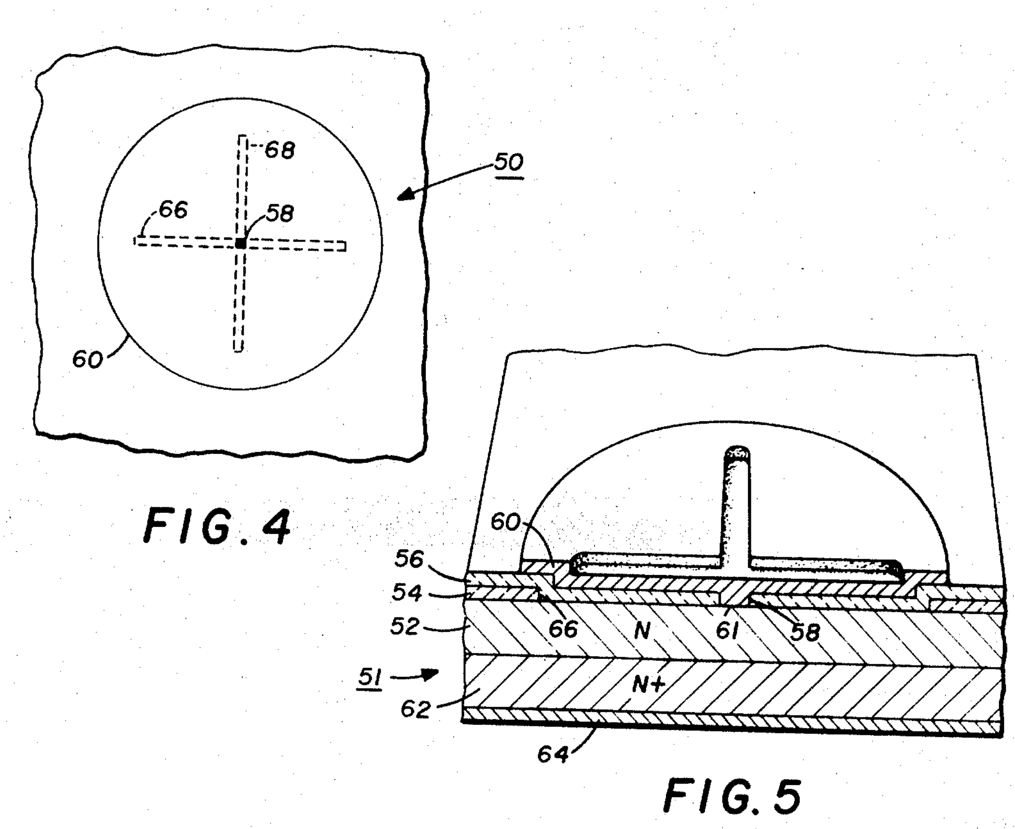
FIG. 4 is a schematic top view of a metal-semiconductor junction diode constructed in accordance with the present invention with details of construction illustrated in dotted outline.
FIG. 5 is a schematic perspective view taken in section substantially along lines 5—5 of FIG. 4.
Figure 6:
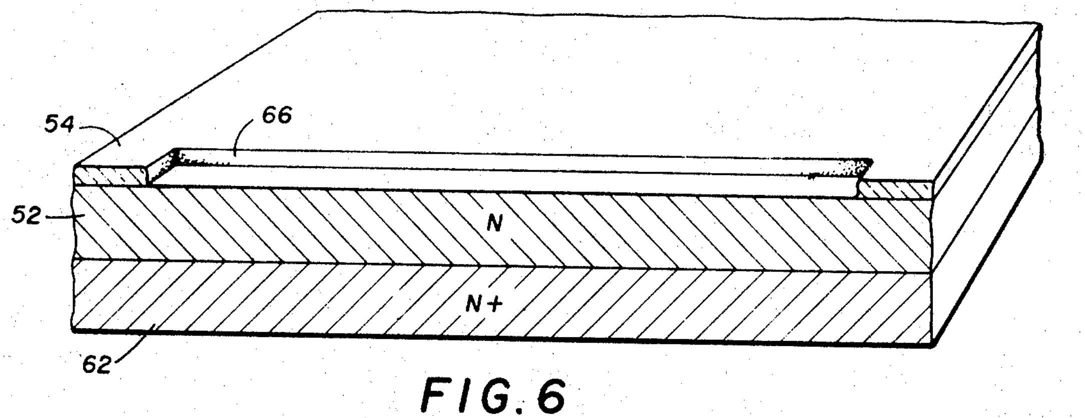
FIG. 6 is a schematic sectional view which serves to illustrate the method of the present invention.
Figure 7:
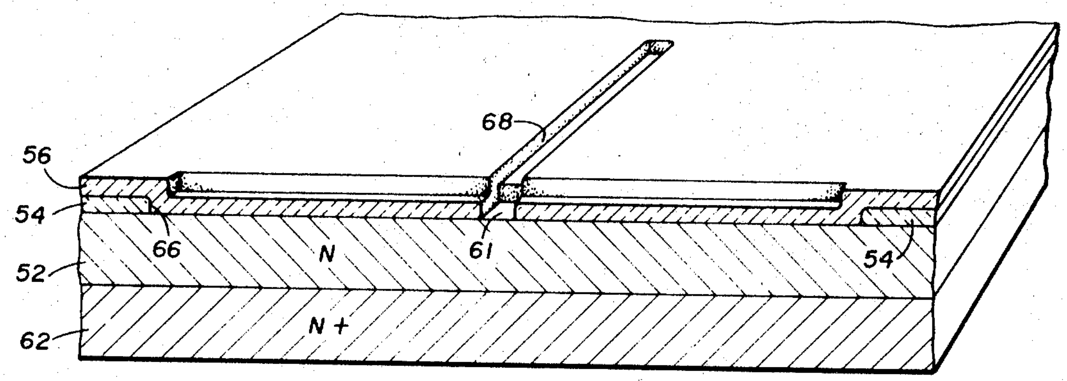
FIG. 7 is a schematic sectional view similar to FIG. 6 which serves to further illustrate the method of the present invention.
Figure 8:
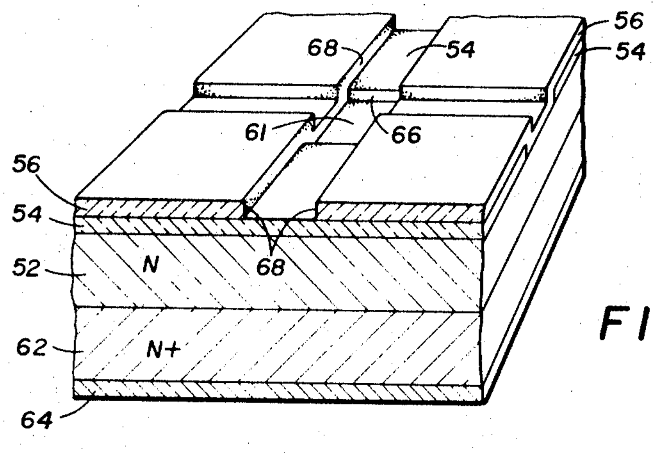
FIG. 8 is a schematic perspective view, broken away to better illustrate the details of construction of the diode of FIG. 4.

In another embodiment of the invention, a process as described above with reference to FIG. 2 may be used to make a small-area diode of the Schottky barrier type. Referring now to FIG. 4 of the drawings, a metal-semiconductor junction diode constructed in accordance with this embodiment of the present invention is indicated generally by the reference numeral 50. As can best be seen in the sectional view of FIG. 5, the diode 50 is comprised of a substrate 51 having a lightly-doped semiconductor region 52 onto which successive insulating layers 54 and 56 have been deposited. A small aperture 58 extends through both of the insulation layers. A metal film 60 has been deposited on the surface of the insulating layer 56 and extends through the aperture 58 into intimate contact with the surface of the semiconductor body 52 to form a metal-semiconductor junction 61 and one of the terminals for the diode. The substrate 51 also has a highly-doped semiconductor region 62 to which a metal film 64 is alloyed to provide the other terminal for the diode.

The aperture 58 therefore the junction area 61 between the metal 60 and semiconductor 52 is very small so that the diode may be used in high-frequency applications. Further, the combined thickness of the insulating layers 54 and 56 may be appreciable such that the capacitance between the metal film 60 and the semiconductor region 52 is reduced to a minimum. The semiconductor substrate may be germanium, silicon, gallium arsenide, or any other suitable semiconductor. As illustrated, the semiconductor region 52 is lightly doped with N-type material, while the region 62 is heavily doped with N-type material to make a more highly conductive terminal for the device. The insulating layers 54 and 56 may be any suitable material, but preferably are $Al_2O_3$ and $SiO_2$, respectively, for purposes which will hereafter be described. The metal terminals 60 and 64 may be gold, molybdenum-gold, aluminum, or other suitable metal. The small aperture 58 is formed at the intersection of elongated slots 66 and 68, indicated in dotted outline in FIG. 4, which are etched in the insulating layers 54 and 56 by means of the process of the present invention which will now be described, and may be as small as necessary in order to obtain the desired high-frequency characteristics. For example, the slots may be as narrow as 1 micron.

Referring now to FIG. 5, the lightly-doped semiconductor region 52 may be epitaxially grown on the more heavily-doped region 62 by conventional techniques, or the two zones may be formed by diffusing a dopant into a single crystal substrate. As previously mentioned, the purpose of the heavily-doped region 62 is to provide good electrical contact between the metal film 64 and the lightly-doped semiconductor region 52. The insulating layer 54 is formed over the entire surface of the semiconductor region 62 using any conventional technique and material such as silicon dioxide ($SiO_2$). Preferably however, the first insulating layer 54 is aluminum trioxide ($Al_2O_3$) which may be deposited on the surface of the substrate by reactive sputtering or other suitable technique. The aluminum trioxide is an amorphous layer and may be deposited and annealed at about 480° C., for example.

After the insulating layer 54 has been deposited, an elongated strip 66 of the layer is selectively removed so as to expose an elongated area of the surface of the semiconductor substrate 52. This may be accomplished by first coating the insulating layer 54 with a photoresist material such as one of the Kodak resists designated KMER or KTFR, the latter being preferred. Next a photomask is placed in contact with the surface of the photoresist film. Due to the thickness of the photomask, the location of the opaque portions of the photomask relative to the surface of the resist, and the wavelength of the exposing light, the light tends to be refracted around any opaque portion of the photomask. This prevents accurately exposing the photoresist around a very small dot. However, defraction of the exposing light is of concern only in one direction around an opaque line on the mask so that the width of a strip of the photoresist masked from exposure can be controlled with considerable accuracy. The masked and unexposed area of the photoresist is then removed by a developing solution to expose the surface of the oxide insulating film 54 in the elongated area 66. Using this technique, it is possible to remove a strip of the photoresist approximately 1 micron in width, while the length of the strip removed might be as much as 3.0 mils. After the strip of the photoresist is removed by developing, the substrate is subjected to a suitable etchant fluid, such as hydrofluoric acid, and the portion of the oxide film 54 which is not protected from the etchant by photoresist is selectively removed to form the elongated slot 66, and expose an area of the substrate approximately the same size as the strip of photoresist removed, i.e., approximately 1 micron in width and approximately 3 mils in length. The photoresist material is then stripped from the surface of the oxide insulating layer 54.

The second insulating layer 56 is then deposited over the surface of the first insulating layer 54 and over the exposed surface of the semiconductor region 52. Preferably, the second insulating layer 56 has a substantially greater etch rate in a given etchant fluid than does the first insulating layer 54. For example, when the insulating layer 54 is fabricated from aluminum trioxide, the second layer 56 might be fabricated from silicon dioxide. The aluminum trioxide has an etch rate of approximately 20 A./sec, while the silicon dioxide has an etch rate of approximately 90 A./sec if deposited or annealed at 420° C. If the silicon dioxide is deposited or annealed at a higher temperature, a lower etch rate is obtained, while the etch rate of aluminum trioxide does not change appreciably with formation temperature.

Next, a coat of photoresist is deposited on the second insulating layer 56 and exposed in all areas except for an elongated area corresponding to the slot 68. Then when the photoresist is developed, the second insulating layer 56 is exposed in the area of the slot 68, and when subjected to the fluid etchant, such as hydrofluoric acid, is selectively removed to form the slot 68. Since the second insulating layer 56 of silicon dioxide etches at over four times the rate of the first insulating layer 54 of aluminum trioxide, the semiconductor substrate 52 will be exposed in the junction area 61 without danger of also being exposed in another area as a result of uncontrolled etching of the first layer 56 during the second etching step. This is a danger because when chemical etching is confined to the very small well formed at the intersection of the two slots, the rate at which the dissolved oxide is carried away decreases, the concentration of oxide in the etchant increases, and the etching rate decreases. After the second insulating layer 56 has been removed by the etchant in the desired area, the surface of the substrate will again be exposed in the area 61. The remaining photoresist is then removed by a suitable stripping fluid.

A so-called negative resist has been heretofore described in connection with the process of this embodiment. When using a negative resist, the exposed portion of the material is polymerized and the unexposed portion is removed by development to form the slot through which the oxide is etched. However, it is to be understood that a positive resist could also be used, in which case the exposed portion is depolymerized and removed by the developing solution. In such a case the narrow slot in the resist may be exposed by light or by an electron beam, and the process carried out as previously described.

In this embodiment, the insulating layers 54 and 56 may be of the same material, preferably silicon dioxide. In this case, the duration of the etching step of the second insulating layer 56 must be closely controlled to insure that only the second layer 56 is removed and that the first layer 54 is not cut through because if the substrate is exposed by spurious etching of the first layer, the device may be shorted. The etch period may be calculated by measuring the thickness of the second insulating layer and determining the etch rate of the oxide in the particular etchant solution experimentally.

Next a metal film is deposited by a conventional technique such as evaporation and condensation over the surface of the second insulating layer 56, and extends through the slot 68 onto the exposed portion of the first insulating layer 54 and through the aperture 58 formed at the intersection of the slots 66 and 68 onto the junction area 61. The excess metal is then selectively removed to leave the metal forming the terminal 60 and the metal-semiconductor junction 61. A metal film may also be deposited on the other side of the substrate to form the terminal 64.

As described, the contact between the metal and the exposed portion of the semiconductor region 52 was produced by a metal film deposited on the surface of the insulating layers. This is the preferred construction for integrated circuit application. However metal can be made to contact the semiconductor to form the metal-semiconductor junction by any suitable means for other applications. For example, the metal spring-whisker used in conventional Schottky barrier diodes could be passed through the aperture 58 into contact with the surface of the semiconductor region. The edges of the insulating layers 54 and 56 forming the aperture 58 would then tend to hold the whisker in place such that the diode would not be as susceptible to vibration.

In one embodiment of the small-area diode, the slots 66 and 68 were formed approximately 0.1 mil in width and approximately 3 mils in length. This resulted in a junction area 61 of approximately 0.01 square mil. The use of two separate insulation layers 54 and 56 of different etching rates insures that only the junction area 61 will be exposed by the etching process. Further, the walls of the aperture 58 are only a single layer high. This is important because when metal is deposited by evaporation, the metal atoms travel in a straight line to the surface on which they collect. The low sides of the aperture 58 reduce the shadowing effect of the walls of the aperture to a minimum and permit a uniform metal-semiconductor junction to be formed. Yet the major part of the metal of the terminal 60 is spaced from the semiconductor region 52 by a double thickness of insulation so as to reduce the stray capacitance by a very significant value, even though the terminal area is as much as 5 mils in diameter, so that a whisker lead wire or strip line conductor may be connected to the terminal.

The planar Schottky barrier diode described above is described and claimed in copending U.S. Pat. application Ser. No. 397,413, filed Sept. 18, 1964, by Warren P. Waters and Byron K. Lovelace, assigned to the assignee of this application, now U.S. Pat. No. 3,388,000, issued June 11, 1968.

From the above detailed description of this embodiment of the invention, it will be evident that a planar metal-semiconductor junction diode has been described which may be fabricated in integrated circuit form. The metal region, the semiconductor region, and the insulating region are integrally bonded to provide improved resistance to mechanical shock. Further, the diode may be fabricated as an integral part of an integrated circuit and the junction area between the metal and the semiconductor material may be made sufficiently small to provide satisfactory operation at very high frequencies. This is made possible by reason of the fact that the junction area is very small, yet the relatively large terminal areas of the diode are separated by an insulator of substantial thickness. The process provides a means whereby a very small aperture may be formed in a relatively thick insulating layer disposed on a semiconductor substrate. The aperture has sloping sides so that metal can be evaporated on the exposed surface of the substrate without adverse shadow effects due to the height of the sides of the aperture. Although the aperture through the insulating layer is so small as to be very difficult to find for alignment purposes during the fabrication process, even when using high-power microscopes, the elongated slots 66 and 68, which may be 3 mils in length, are easily located so that the location of the aperture may be easily determined.

Methods of aperturing in accordance with the invention may be applied to the formation of apertures in oxide and other films on both semiconductor and other substrates and may be used in the formation of apertures in foils or thin sheets of a wide range of materials.

It will be seen from the above examples of methods carrying out the invention that the regions to be apertured are defined by successively forming two sets of transversely extending strips and thus problems of corner resolution are avoided.

Reference is made to FIGS. 9–13, wherein there is illustrated a method for making a small geometry high-frequency junction transistor, at various stages of manufacture thereof, in accordance with and as another illustration of a use of the present invention. It is to be noted that these views are of only one segment or wafer of an entire semiconductor slice which comprises many such segments during manufacture and is separated into individual wafers only after the diffusions have been made and the contacts applied.

Figures 9, 10:
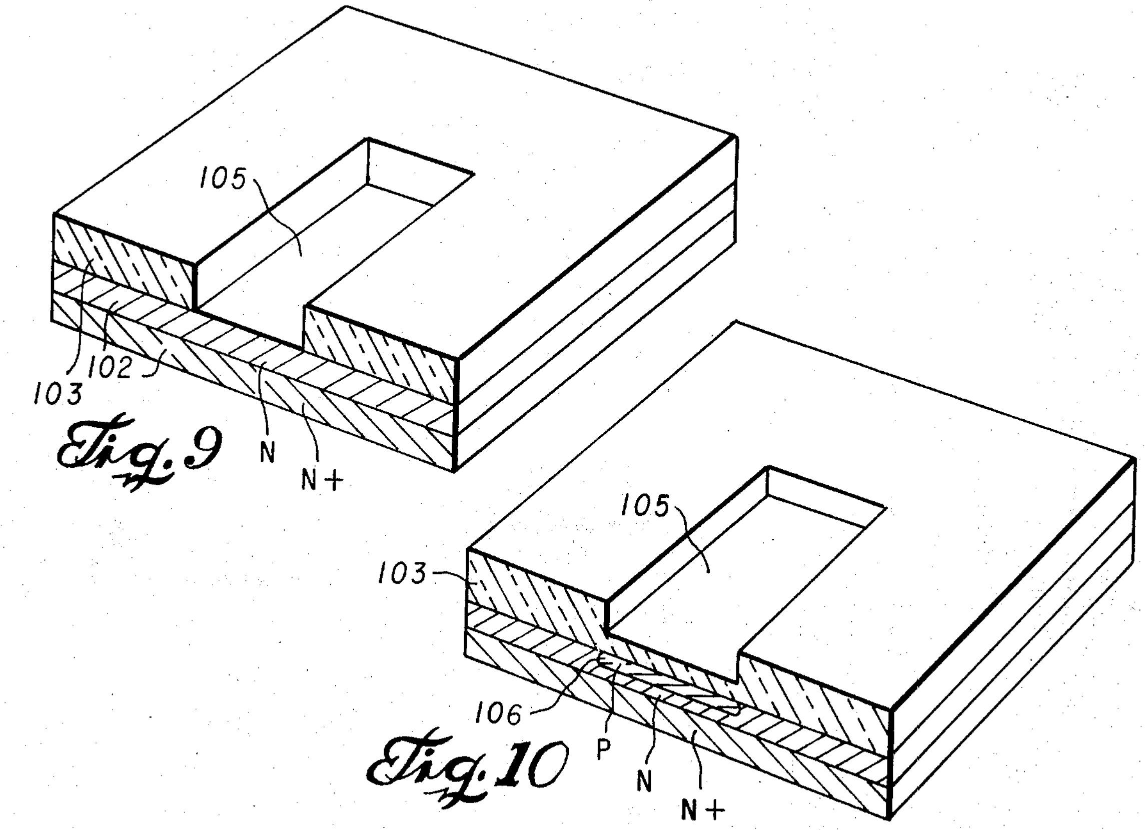
FIGS. 9–13 show another application of the invention in fabricating a small geometry-high-frequency transistor.

Referring now to FIG. 9, there is described the first step in the method of this invention. A body 101 of single crystal low resistivity semiconductor material, such as N+ doped silicon, having a resistivity of perhaps 0.010 to 0.025 Ω/cm. is used as the starting material. Upon this body 101 there is formed a layer 102 of N-type high-resistivity semiconductor material, the layer 102 being formed by conventional techniques such as epitaxial deposition. An insulating layer 103 is next formed over the entire surface of the layer 102 using any conventional technique and material. For example the insulating layer 103 could be formed of silicon oxide to a thickness of approximately 8,000 A.

After the insulating layer 103 has been deposited, an elongated strip 105 of the layer is selectively removed so as to expose a corresponding area of the surface of the semiconductor layer 102. This removal may be accomplished by first coating the oxide layer 103 with a photoresist material such as one of the Kodak resists designated KMER or KTFR, the latter being preferred. Next, a photomask is placed in contact with the surface of the photoresist film so as to mask an area corresponding to the region 105. The masked photoresist is then exposed and developed, resulting in exposing the surface of the oxide layer 103 solely in the elongated area 105. The top of the slice is then subjected to suitable etching fluid such as buffered HF and the portion of the oxide film 103 which is not protected from the etchant by the exposed photoresist is selectively removed to form the elongated slot 105, thereby exposing an area of the N-type layer 102 corresponding approximately to the size of the strip of the oxide removed. The rest of the photoresist material is then stripped from the surface of the oxide layer 103. There is then diffused into the exposed portion of the N-type layer 102 (hereafter referred to as the collector region) within the slot 105 a predetermined amount of acceptor impurity so as to form the P-layer 106, (hereafter referred to as the base region). A thin layer 104 of silicon oxide naturally forms during this diffusion process as shown in FIG. 10 so as to completely cover the upper surface of the P-type base layer 106 within the elongated slot 105. Intermediate the base region 106 and the collector layer 102 there is provided a junction which serves as the collector-base junction of the transistor device.

Figures 11, 12:
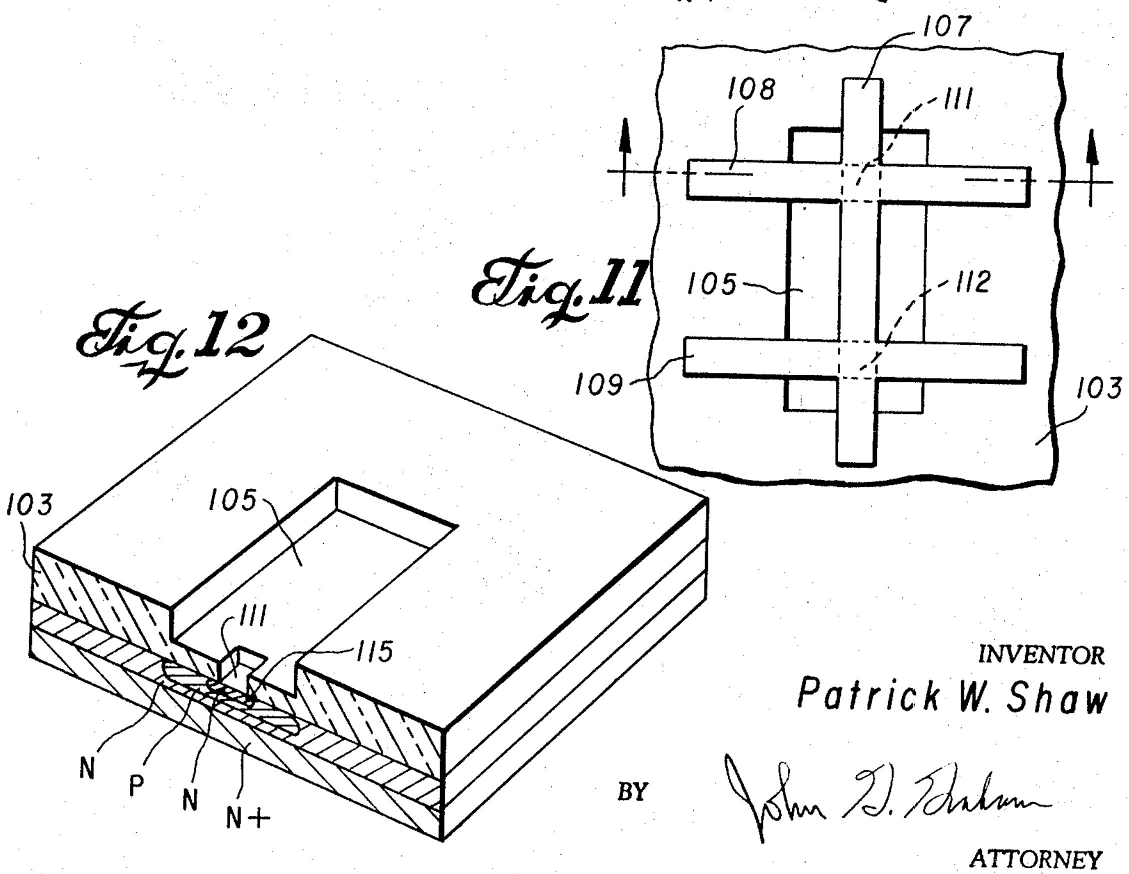
Figure 13:
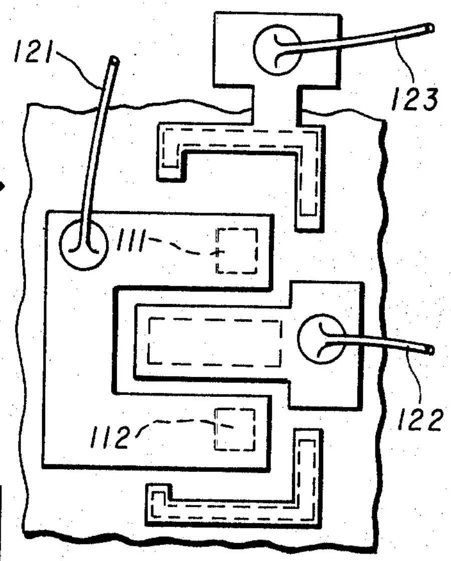

Referring now to FIGS. 11 and 12, there is described the next step according to the process of this invention whereby the emitter-base junction or junctions of the transistor are formed to a minimum area. Accordingly, a coat of photoresist is deposited upon the upper surface of the structure shown in FIG. 10 so as to completely cover the oxide layers 103 and 104. Using the photographic techniques previously described, the entire photoresist layer is exposed except for a thin stripe 107 oriented above the region 105. A series of stripes 108 and 109 are then subsequently formed in the photoresist so as to intersect the originally formed strip 107 at a 90° angle. These latter strips 108 and 109 may be formed in the same photoresist layer in which the stripe 107 was formed, or a second layer of photoresist may be applied after the formation of stripe 107, the stripes 108 and 109 being formed in this second layer of photoresist. Application of a suitable etchant to the top surface of the oxide layers will result in the production of small apertures 111 and 112 in the oxide layer 104 corresponding to the intersection of the stripes, the apertures exposing the base region 106. Since the width of the elongated stripes 107, 108 and 109 will normally be as narrow as photographic masking techniques will allow, presently at a value of approximately 0.1 mil, the small apertures 111 and 112 will be of an area of approximately 0.01 sq. mil. FIG. 12 shows a cross sectional view of the transistor showing the formation of one of the small apertures 111. Into the aperture 111 there will then be diffused an N-type impurity such as phosphorus resulting in the emitter region 115. As a consequence of this diffusion a thin oxide layer will form over the emitter region 115 within the aperture 111.

Pursuant to the description above, it is to be noted that the width of the elongated slot 105 is greater than the width of the narrow stripe 107. For example, if the slot 105 is formed to a width of 0.2 to 0.4 mil, the width of the stripe 107 may be approximately 0.1 mil. This difference in width will allow the orientation of the stripe 107 within the boundaries defined by the slot 105 by photographic masking techniques without presenting a formidable task of resolution.

As the final steps in the manufacture of the transistor, photographic masking and etching techniques are utilized to expose the emitter, base and collector layers so that ohmic contacts may be deposited upon the exposed areas for the subsequent connection of external leads. The entire upper surface of the transistor structure 120 shown in FIG. 12 is first subjected to an etchant fluid such as buffered HF. Since the oxide layer above the emitter region is substantially thinner than any of the other oxide layers, it is possible to control the etching steps so as to completely cut through the layer above this region and expose the emitter region 115 without consequently cutting through any of the other layers.

Photomasking and etching are then employed so as to cut through the oxide layers 103 and 104 exposing the collector layer and the base layer respectively. Expanded ohmic contacts fabricated of aluminum or molybdenum and gold, for example, are then deposited upon the exposed layers, and gold wires are bonded to the ohmic contacts to form the emitter lead 121, the base lead 122, and the collector lead 123 as illustrated in the plan view of FIG. 13. As an alternative to cutting through the oxide layer 103 to make ohmic contact to the collector region, contact may be made directly to the N+ layer 101 on the backside of the transistor, the layer 101 serving as a low resistance contact region to the collector layer 102.

Using the technique just described a matrix of narrow intersecting elongated stripes such as 107, 108 and 109 may be formed to provide a large number of emitter regions overlying a plurality of base regions, these regions being respectively connected together to provide a transistor device capable of being operated at high frequency, high power and high gain. The emitter-base junctions will be of extremely small area, having been formed by the above-described cross-striped technique within the layer or layers of photoresist.

Figure 14:
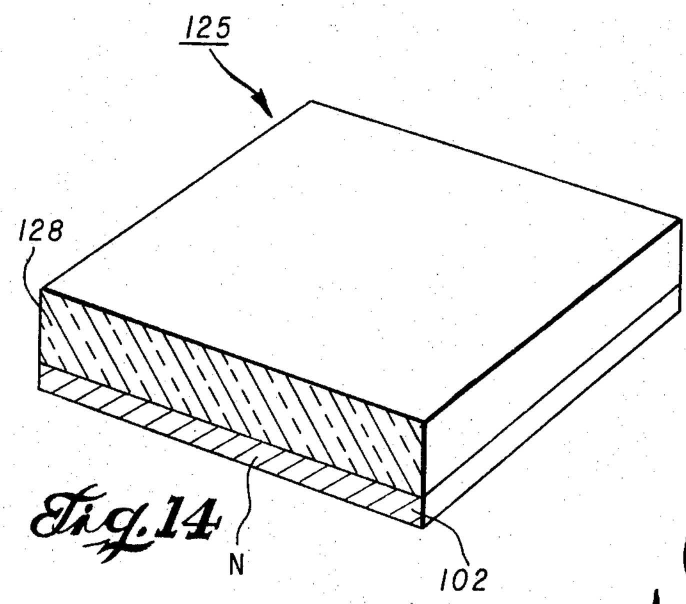
FIGS. 14–17 show still another application of this invention in fabricating a surface-oriented junction transistor.

Considering now the present invention as same relates to small geometry surface-oriented junction transistors, reference is made to FIGS. 14–17 of the drawings. As depicted in FIG. 14 an oxide layer 128 is formed upon the upper surface of a thin base layer 127 of high-resistivity N-type material to a thickness of approximately 8,000 A.

Figure 15:
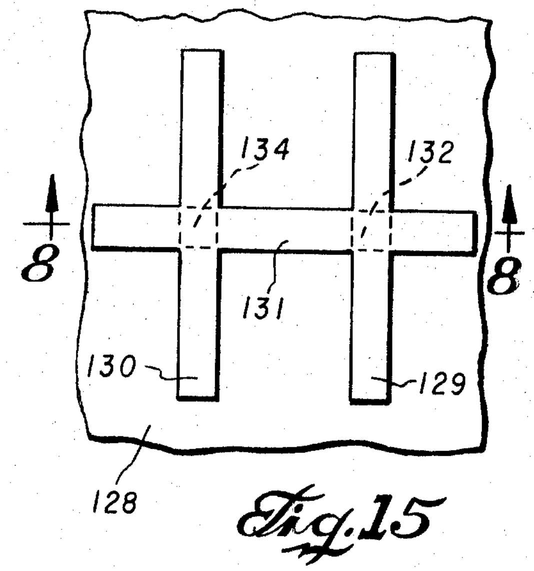
Figure 16:
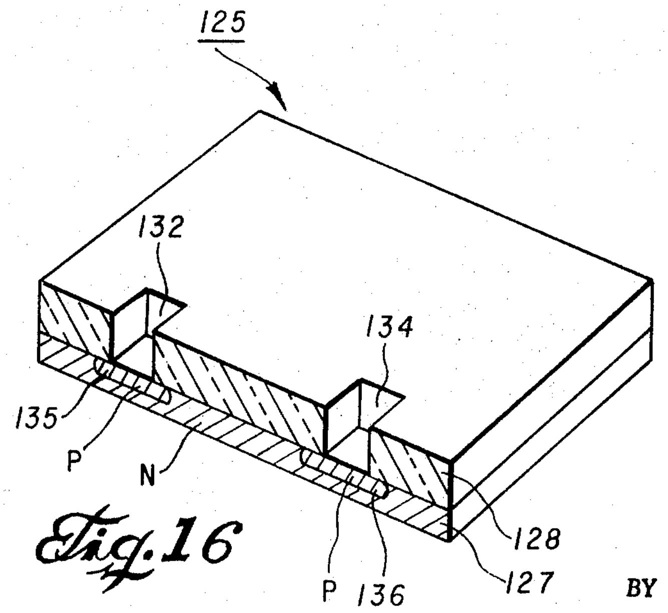
Figure 17:
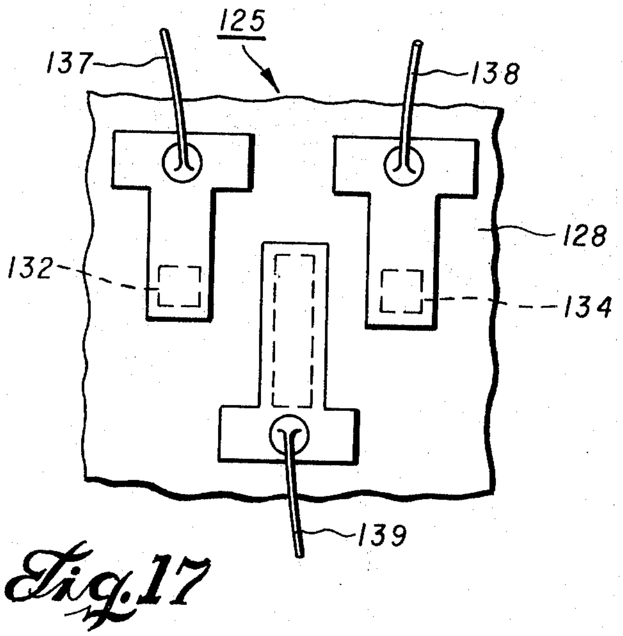

After the oxide layer 128 is formed, a layer of photoresist is placed upon the surface of the oxide layer, and using the same photographic techniques described in the previous embodiment, a long narrow stripe 131 is formed within the photoresist layer as depicted in FIG. 15. This slot may be as narrow as 0.1 mil in width and approximately 2 mils in length. In like manner the cross stripes 129 and 130 are formed in the layer of photoresist, each stripe also having a width of approximately 0.1 mil and oriented in a manner so as to intersect the originally formed stripe 131 at an angle of 90°. As a result of these photographic techniques, there will be produced at the intersections apertures 132 and 134 within the photoresist, exposing corresponding areas of the oxide layer 128. The exposed areas of the oxide 132 and 134 are then subjected to a fluid etchant, for example, buffered HF, whereby the apertures 132 and 134 shown in FIG. 16 are formed, thereby exposing the base layer 127 within these apertures.

Within the small openings 132 and 134 and upon the exposed surfaces of the N-type base layer 127 within these apertures, there is thereby disposed a quantity of acceptor impurity, as in the form of a silicon-phosphorus alloy, and heat is applied whereby the impurity diffuses into the base layer 127 to form P-type regions 135 and 136 the collector and emitter regions respectively. The unremoved portions of the silicon oxide layer 128 will serve as a mask to limit the lateral diffusion of the donor impurity. As a result of these diffusions, there is provided intermediate the base layer 127 and the collector region 135 a junction which serves as the collector-base junction for the transistor device 125. In like manner there will be provided intermediate the base region 127 and the emitter region 136 a junction which serves as the emitter-base junction for the transistor device 125. Due to the extremely small areas that may be obtained using the cross-striping techniques as described to form the openings 132 and 134, it is possible with the state of the art at its present level to produce very high frequency transistor devices for the junctions having a functioning area of approximately 0.01 sq. mil. During the P-type diffusion there will be consequently formed a thin layer of silicon oxide which completely covers the upper surface of the collector region 135 and the upper surface of the emitter region 136. This oxide layer will be extremely thin, less than one-sixteenth the thickness of the oxide layer 128.

The thin oxide layer above the collector and emitter region may then be removed by any conventional technique, such as dip etching, the upper surfaces of the collector region 135 and the emitter region 136 thereby being exposed. Subsequently, using a photographic masking and etching process, a portion of the protective oxide layer 128 is selectively removed to expose the upper surface of the base region 127. Aluminum or molybdenum and gold is then deposited upon the exposed emitter, collector and base surfaces and selectively etched so as to form expanded ohmic contacts to allow for external collector lead 137, external emitter lead 138, and external base lead 139 to be attached as illustrated in the plan view of FIG. 17.

While the invention has been described with reference to specific methods and embodiments, it is to be understood that this description is not to be construed in a limiting sense. Fore example, although the narrow stripes formed in the photoresist were oriented perpendicular to each other, the resulting apertures formed at their intersection thereby being of a minimum area, the intersection of the stripes at oblique angles will also produce very small apertures which are well defined and free from distortion, thus allowing for small geometry junctions to be fabricated.

Although two types of transistors have been described with reference to particular embodiments, the process described may be utilized to form various other type active semiconductor devices such as diodes, field-effect transistors, etc. Additionally, the above description is equally applicable to NPN configurations as well as PNP configurations.

Various other modifications of the disclosed embodiments as well as other embodiments of the invention may become apparent to a person skilled in the art without departing from the spirit and scope of the invention as defined by the appended claims.

What is claimed is:

1. A method of aperturing a layer of insulating material formed on a semiconductor substrate by photochemical techniques, comprising the following steps:
   a. depositing said insulating layer on at least one major surface of said semiconductor substrate;
   b. coating the outer surface of said insulating layer with photosensitive material;
   c. selectively forming a non-etch-resistant first zone of said photosensitive material on said coated surface and thereby producing etch-resistant areas of said photosensitive material on said coated surface adjacent to said first zone;
   d. selectively defining a second zone of said photosensitive material on said coated surface that is transverse to and at least partially overlapping said first zone;
   e. selectively exposing said coated surface of said insulating material so as to maintain a non-etch-resistant area of photosensitive material within said first zone at areas where said second zone overlaps said first zone, and to thereby render the remaining areas of said first zone etch resistant;
   f. removing by solvents the non-etch resistant area of said photosensitive material from within said first zone and thereby producing a third zone which is defined by the overlapping areas of said first and second zones; and
   g. etching the insulating material bounded by said third zone so as to produce a geometrically shaped aperture therein that is defined by the overlapping portions of said first and second zones and extends to said semiconductor substrate; wherein
   h. said geometrically shaped aperture formed in said semiconductor substrate has sidewalls that are substantially perpendicular to said semiconductor substrate.

2. A method of aperturing a thin film member formed on a support substrate by photochemical techniques, comprising the following steps:
   a. depositing said thin film member on at least one surface of said support substrate;
   b. forming a coating of photosensitive material on the outer surface of said thin film member;

c. forming a non-etch-resistant first strip with adjacent etch-resistant areas on said photosensitive coating;
d. forming a second strip over said photosensitive coating that intersects said first strip;
e. exposing said photosensitive coating to render the non-etch-resistant, non-intersecting portions of said first strip etch resistant, and to retain the intersection portions of said first strip non-etch-resistant;
f. removing by solvents said non-etch-resistant material within said intersecting portions from the surface of said thin film member; and
g. etching the thin film member bounded by the area defined by the intersection portion of said strips so as to produce a geometrically shaped aperture in said thin film member; wherein
h. said geometrically shaped aperture has side walls that are substantially perpendicular to said support substrate.

3. A method of aperturing a thin film member formed on a support substrate by photochemical masking, exposing and etching techniques, comprising the following steps:
a. depositing said thin film member over at least one surface of said support substrate;
b. coating the outer surface of said thin film member with photosensitive material;
c. placing at least one photomask over said coated surface, such one mask having at least one zone that has light transmitting characteristics substantially different than the light transmitting characteristics of its remaining area;
d. photographically exposing said coated surface through said one photomask to provide a first non-etch-resistant zone of said photosensitive material on said coated surface that is contiguous with said one zone of said photomask, and to produce a first etch-resistant area of said photosensitive material on said coated surface that is contiguous with the remaining area of said one photomask;
e. placing at least one other photomask over said coated surface, such one other photomask having at least one zone that has light transmitting characteristics substantially different than the light transmitting characteristics of its remaining area;
f. positioning said one other photomask so that its one zone is transverse to and at least partially overlapping said first non-etch-resistant zone of photosensitive material on said coated surface;
g. photographically exposing said coated surface through said one other photomask to maintain a non-etch-resistant zone of material on said coated surface that is contiguous with the partially overlapping portions of said one zone of said one other photomask and said first non-etch-resistant zone of said photosensitive material, and to produce a second etch-resistant area of said material on the unexposed portion of said coated surface that is contiguous with the remaining area of said one other photomask;
h. removing by solvents the non-exposed photosensitive material in said non-etch-resistant zone on said coated surface; and
i. etching the material of said thin film member that is contiguous to said non-etch-resistant zone so as to produce at least one geometrically shaped aperture that is defined by the overlapping areas of the zones of said photomasks; wherein
j. said geometrically shaped aperture has sidewalls that are substantially perpendicular to said support substrate.

4. The method of claim 3 in which the widths of the zones of said photomasks are substantially smaller than their lengths.

5. The method of claim 3 in which the zone of at least one of said photomasks has non-parallel sides to produce a geometrically shaped aperture having at least one pair of non-parallel opposite edges.

6. The method of claim 3 in which the zones of said photomasks have equal widths throughout their lengths and are linear so as to produce a geometrically shaped aperture having parallel opposite edges.

7. The method of claim 6 in which said one other photomask is positioned so that its zone is substantially perpendicular to and at least partially overlapping said first non-etch-resistant zone of said coated surface so as to produce a rectangular aperture in which one pair of opposite edges are substantially equal in length to the width of the zone of said one mask and in which one pair of opposite edges are substantially equal in length to the width of the zone of said one other photomask.

8. A method of aperturing an insulating member formed on a semiconductor substrate photochemical masking, exposing and etching techniques, comprising the following steps:
a. depositing an insulating member over at least one surface of a semiconductor substrate;
b. coating the outer surface of said insulating member with photosensitive material;
c. placing at least one photomask over said coated surface, such one mask having at least one zone that has light transmitting characteristics substantially different than the light transmitting characteristics of its remaining area;
d. photographically exposing said coated surface through said one photomask to provide a first non-etch-resistant zone of said photosensitive material on said coated surface that is contiguous with said one zone of said photomask and to produce a first etch-resistant area of said photosensitive material on said coated surface that is contiguous with the remaining area of said photomask;
e. removing by solvents the non-exposed photosensitive material in said first non-etch-resistant zone on said coated surface;
f. etching the material of said substrate that is contiguous with said first non-etch-resistant zone to produce at least one channel that is defined by the one zone of said one photomask;
g. stripping by solvents said first etch-resistant area on said coated surface so as to remove the exposed photosensitive material therein;
h. depositing a layer of insulating material over the outer surface of said insulating member and over the outer surface of the bottom wall of said one channel so as to form a first channel in said insulating layer that has a width and length substantially equal to the width and length of said one channel;
i. coating the outer surface of said insulating layer with additional photosensitive material;
j. placing at least one other photomask over said coated surface, such one other photomask having at least one zone that has light transmitting characteristics substantially different then the light transmitting characteristics of its remaining area;
k. positioning said one other photomask so that its one zone is transverse to and at least partially overlapping said first channel;
l. photographically exposing said coated surface through said one other photomask to provide a second non-etch-resistant zone of said additional photosensitive material on said coated surface that is contiguous with the remaining area of said one other photomask;
m. removing by solvents the non-exposed additional photosensitive material in said second non-etch-resistant zone on said coated surface; and
n. etching the additional photosensitive material that is contiguous with said second non-etch-resistant zone to produce at least one geometrically shaped aperture extending to said substrate that is defined by the overlapping areas of the one other photomask and said first channel, and to produce at least one channel extending to said insulating member that is defined by the overlying areas of the one zone of said other photomask that does not overlap said first channel; wherein o. said geometrically shaped aperture and said one channel each have substantially perpendicular side walls that are respectively perpendicular to said semiconductor substrate and to the outer surface of said insulating member.

9. The method of claim 8 in which the widths of the zones of said photomasks are substantially smaller than their lengths.

10. The method of claim 8 in which the zone of at least one of said photomasks has non-parallel sides to produce a geometrically shaped aperture and one channel with each having at least one pair of non-parallel opposite sides.

11. The method of claim 8 in which the zones of said photomasks have equal widths throughout their lengths and are linear to produce a geometrically shaped aperture and one channel.

12. The method of claim 11 in which said one other photomask is positioned so that its zone is substantially perpendicular to and at least partially overlapping said first channel to produce a rectangular shaped aperture extending to said substrate and a rectangular shaped channel extending to said additional material.

13. A method of aperturing a thin film member by photochemical techniques, comprising the following steps:

a. depositing an insulating member on at least one surface of a thin film member;
b. coating at least one surface of said insulating member with photosensitive material;
c. placing at least two photomasks over said one coated surface in parallel-plan orientation, each of said photomasks having at least one zone that has light transmitting characteristics of its remaining area, with the zone of one photomask being oriented non-parallel to but at least partially overlapping the zone of the other photomask;
d. photographically exposing said material on said coated surface through said photomasks to provide a non-etch-resistant zone of said material on said coated surface that is contiguous with the overlapping portions of the zones of said photomasks, and to produce an etch-resistant area of said photosensitive material on said coated surface that is contiguous with the remaining area of said photomasks; and
e. removing by solvents the non-exposed photosensitive material in said non-etch-resistant zone on said coated surface; and
f. etching the material of said thin film member that is contiguous with said non-etch-resistant zone to produce an aperture therein that is defined by the overlapping areas of said zones of said photomasks; wherein
g. said aperture has sidewalls that are substantially perpendicular to said one surface of said thin film member.

14. The method of claim 13 in which the widths of the zones of said photomasks are substantially smaller than their lengths.

15. The method of claim 13 in which the zone of at least one of said photomasks has non-parallel sides to produce a geometrically shaped aperture having at least one pair of non-parallel opposite sides.

16. The method of claim 13 in which the zones of said photomasks have equal widths through out their lengths and are linear to produce a geometrically shaped aperture having parallel opposite edges.

17. The method of claim 16 in which the zone of said one photomask is oriented perpendicular to but at least partially overlapping the zone of said one other photomask so as to produce a rectangular aperture having a pair of sides substantially equal in length to the width of the zone of said one mask and a pair of sides substantially equal in length to the width of the zone of said one other photomask.

18. A method of exposing a relatively small area on the surface of a semiconductor substrate, comprising the following steps:

a. depositing a first insulating member of predetermined thickness over one surface of said semiconductor substrate;
b. defining a first elongated zone on said first insulating member;
c. removing the portion of said first insulating member that is within said first zone so as to produce a first channel in said first insulating member that is defined by said first zone and expose an area of the surface of said substrate that is contiguous to said first channel;
d. depositing a second insulating member over said first insulating member and within said first channel, the thickness of said second insulating member being no greater than the thickness of said first insulating member;
e. defining a second elongated zone on said second insulating member, said second zone being transverse to and at least partially overlapping said first channel; and
f. removing the portion of said second insulating member that is within said second zone so as to produce a second channel in said second insulating member that is defined by said second zone and to expose an area of the surface of said substrate that is contiguous to the overlapping portions of said first and second channels; wherein
g. said first and second channels each have sidewalls that are substantially perpendicular to the plane said one surface of said semiconductor substrate.

19. A method of exposing a relatively small area of the surface of a semiconductor substrate, comprising the following steps:

a. depositing a first insulating member of predetermined thickness over one surface of said semiconductor substrate;
b. defining a first elongates zone on said first insulating member;
c. removing the portion of said first insulating member that is within said first zone so as to produce a first channel in said first insulating member that is defined by said first zone and expose an area of the surface of said substrate that is contiguous to said first channel;
d. depositing a second insulating member over said first insulating member and within said first channel so that the thickness of the insulating material in said first channel is less than the thickness of the insulating material adjoining said first channel;
e. defining a second elongated zone on said second insulating member, said second zone overlapping said first channel; and
f. removing the portion of said second insulating member that is within the second zone so as to produce a second channel in said second insulating member that is defined by said second zone and to expose an area of the surface of said substrate that is contiguous to the overlapping portions of said first and second channels; wherein
g. said first and second channels each have sidewalls that are substantially perpendicular to said one surface of said semiconductor substrate.

20. A method of aperturing an insulating member formed on a semiconductor substrate, comprising the following steps:

a. depositing a first insulating layer over the surface of a semiconductor substrate;
b. selectively removing a first elongated strip of the first insulating layer to expose an elongated area of the surface of the semiconductor substrate;
c. depositing a second insulating layer over the first insulating layer and over the exposed surface of the semiconductor substrate;
d. selectively removing a second elongated strip of the second insulating layer which intersects the first elongated strip to expose an area of the surface of the semiconductor substrate defined generally by the intersection of the opening resulting from the removal of the two elongated strips; wherein
e. said first and second strips each have sidewalls that are substantially perpendicular to the surface of said semiconductor substrate.

* * * * *